(12) United States Patent
Irie

(10) Patent No.: US 7,672,596 B2
(45) Date of Patent: Mar. 2, 2010

(54) OPTICAL RECEIVER CIRCUIT APPLICABLE TO MULTIPLE TRANSMISSION RATES

(75) Inventor: Takeshi Irie, Yokohama (JP)

(73) Assignee: Sumitomo Electric Industries Ltd., Osaka (JP)

(*) Notice: Subject to any disclaimer, the term of this patent is extended or adjusted under 35 U.S.C. 154(b) by 724 days.

(21) Appl. No.: 11/450,873

(22) Filed: Jun. 12, 2006

(65) Prior Publication Data

US 2007/0160371 A1    Jul. 12, 2007

(30) Foreign Application Priority Data

Jun. 14, 2005    (JP)    ............... 2005-173736

(51) Int. Cl.
*H04B 10/00*    (2006.01)

(52) U.S. Cl. ............... 398/155; 398/154; 398/161; 398/43; 398/76

(58) Field of Classification Search ............... 398/155, 398/161, 43, 76, 154
See application file for complete search history.

(56) References Cited

U.S. PATENT DOCUMENTS

| | | | |
|---|---|---|---|
| 6,584,304 B1 | 6/2003 | Thomsen et al. | |
| 6,594,070 B2* | 7/2003 | Sugata et al. | 359/326 |
| 7,076,177 B1* | 7/2006 | Yang et al. | 398/208 |
| 7,099,582 B2* | 8/2006 | Belhadj-Yahya et al. | 398/27 |
| 7,158,727 B2* | 1/2007 | Pathak et al. | 398/155 |
| 7,239,813 B2* | 7/2007 | Yajima et al. | 398/154 |
| 7,372,804 B2* | 5/2008 | Arikawa et al. | 370/217 |
| 2002/0039211 A1* | 4/2002 | Shen et al. | 359/110 |
| 2003/0007224 A1* | 1/2003 | Yamashita et al. | 359/189 |
| 2004/0091028 A1* | 5/2004 | Aronson et al. | 375/219 |
| 2005/0078780 A1* | 4/2005 | Chou et al. | 375/350 |
| 2005/0249126 A1* | 11/2005 | Chang et al. | 370/252 |

FOREIGN PATENT DOCUMENTS

| | | |
|---|---|---|
| JP | 55-3246 | 1/1980 |
| JP | 2-20142 | 1/1990 |
| JP | 2-27850 | 1/1990 |
| JP | 5-176013 | 7/1993 |
| JP | 08-097658 | 4/1996 |
| JP | 08-107427 | 4/1996 |
| JP | 10-150417 | 6/1998 |
| JP | 2003-298674 | 10/2003 |
| WO | 01/15347 | 3/2001 |

OTHER PUBLICATIONS

Japanese Notice of Allowance issued Oct. 14, 2008.

* cited by examiner

*Primary Examiner*—Ken N Vanderpuye
*Assistant Examiner*—Hibret A Woldekidan
(74) *Attorney, Agent, or Firm*—Smith, Gambrell & Russell, LLP

(57) ABSTRACT

An optical receiver circuit is provided which is able to receive optical signals having a variable transmission rate, without loss of data. The optical receiver circuit according to the present invention has a light-receiving section for converting an optical signal with a variable transmission rate into an electric signal. A recovery section recovers a plurality of different clock signals and data corresponding to possible transmission rates. These data are stored into a plurality of memories and at the same time a decision section decides the transmission rate. A switch section reads data from one of the memories selected according to the result of the decision.

8 Claims, 4 Drawing Sheets

OPTICAL RECEIVER CIRCUIT APPLICABLE TO MULTIPLE TRANSMISSION RATES

BACKGROUND OF THE INVENTION

1. Technical Field

The present invention relates to an optical receiver circuit used in optical communication.

2. Related Prior Art

A variety of transmission rates of optical signals are stipulated in transmission standards for optical communication. In recent years, there are demands for optical receiver circuits capable of receiving an optical signal with a variable transmission rate, i.e., optical receiver circuits applicable to multi-rate communication.

Receivers applicable to multiple transmission rates are known in the field of wireless communication. For example, the receiver disclosed in U.S. Pat. No. 6,584,304 is provided with sets of a filter and an amplifier for the respective transmission rates to receive radio signals. A switch for determining the destination of a radio signal is installed ahead of the filters and amplifiers. The operation of this switch is controlled according to the transmission rates, thereby supplying a radio signal to the filter and amplifier set suitable to the transmission rate of the radio signal. However, when the technology described in the patent document 1 is applied to optical receiver circuits, received data are lost during deciding the transmission rate and while changing the state of the switch.

Therefore, an object of the present invention is to provide an optical receiver circuit capable of receiving an optical signal with a variable transmission rate without loss of data.

SUMMARY OF THE INVENTION

An aspect of the present invention relates to the configuration of an optical receiver circuit applicable to multiple transmission rates. This optical receiver circuit comprises a receiver optical assembly for converting an optical signal into an electric signal; a recovery section for extracting a clock signal and a data signal from the electric signal; a memory section for storing the extracted data signal; a decision section for reading the data signal from the memory section and for deciding a principal frequency component in the data signal; and a selection section for reading the stored data signal according to an output of the decision section.

Extracting a clock signal and a data signal in the recovery section includes individually extracting a plurality of clock signals and data signals both corresponding to the transmission rates. The extracted data signals are stored individually in a plurality of memories. The decision section simultaneously reads the plurality of data signals from the memories, yields intensities of the principal frequency components in the respective signals, and specifies the principal frequency component in one of the data signals. The selection section selects and outputs the data signal containing the specified principal frequency component from the optical receiver circuit.

Namely, since the decision section can obtain a significant output only when the data signal containing the principal frequency component is filtered at the principal frequency, it is possible to specify at which one of the transmission rates the optical signal has been received. Either in a case where a data signal not containing a principal frequency component is filtered at the principal frequency, or in a case where a data signal containing a principal frequency component is filtered at frequencies excluding the principal frequency, a filter provides no significant output and the decision section is thus able to decide the principal frequency component in the data signal, i.e., the transmission rate of the optical signal.

During this decision operation the data is continuously stored in the memories and read out of the memories after the decision; therefore, the data can be recovered without loss of information.

Another aspect of the present invention relates to a method of receiving an optical signal that can be of multiple transmission rates. The method according to the present invention comprises: (a) converting an optical signal into an electric signal; (b) extracting a plurality of clock signals and data signals corresponding to the plurality of transmission rates from the electric signal; (c) filtering the data signals and deciding a transmission rate; and (d) selecting a data signal corresponding to the decided transmission rate.

In this method, the data signals extracted in the step (b) may be stored in memories, and in the step (d) the data signal corresponding to the decided transmission rate may be read and outputted from the memory. The method may further comprise, prior to the extracting step (b), preparing a plurality of units each having a low-pass filter and an amplifier connected to each other, wherein cutoff frequencies of the low-pass filters, and frequency bands and gains of the amplifiers corresponds to the transmission rates, and the number of the units is same as the assumed number of the transmission rates. The electric signal may pass through the units, and the clock signals and data signals may be extracted from outputs of the units.

The filtering in the step (c) may include continuously feeding the plurality of data signals to a plurality of digital filters having respective cutoff frequencies corresponding to the assumed transmission rates, and sequentially comparing outputs of these digital filters, thereby deciding the transmission rate. Each digital filter provides a significant output only when the data signal containing a principal frequency component corresponding to the transmission rate is filtered by the digital filter having the cutoff frequency equal to the principal frequency. Either in a case where a data signal not containing the principal frequency component is filtered at the principal frequency or in a case where a data signal containing the principal frequency component is filtered at frequencies excluding the principal frequency, the digital filter provides no significant output. Thus it is possible to accurately decide the transmission rate of the optical signal.

DESCRIPTION OF THE PREFERRED EMBODIMENTS

Figure 1:
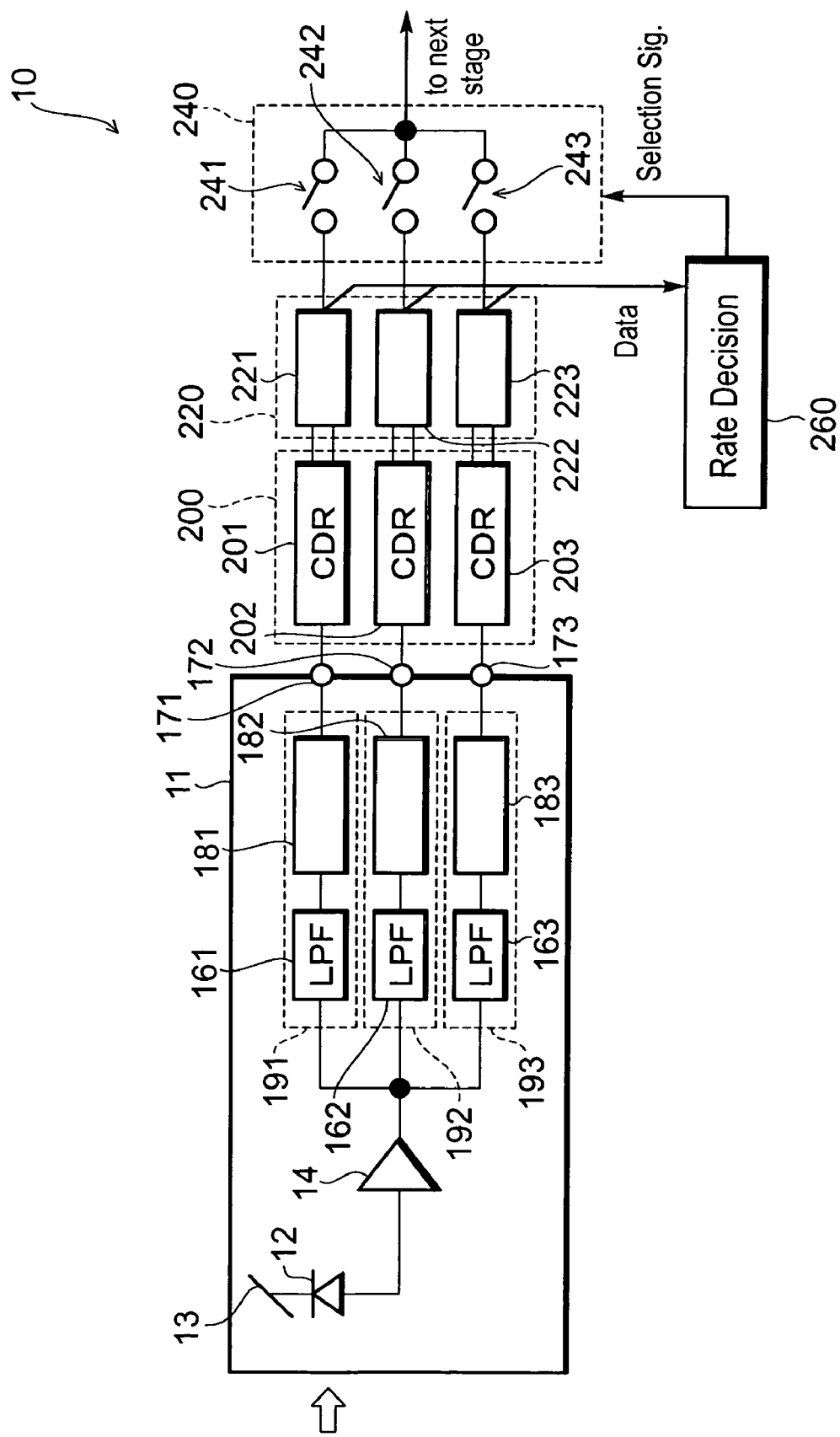
FIG. 1 is a circuit block diagram showing an optical receiver circuit according to the first embodiment.

The preferred embodiments of the present invention will be described below in detail with reference to the drawings. In the drawings identical or equivalent parts will be denoted by the same reference symbols.

First Embodiment

FIG. 1 is a circuit block diagram showing an optical receiver circuit according to the first embodiment of the present invention. This optical receiver circuit 10 is applicable to multi-rate communication and is able to receive an optical signal having a variable transmission rate and to convert the optical signal into an electric signal. The transmission rates in optical communication are defined in transmission standards such as SONET/SDH, and a plurality of quadrupling transmission rates are stipulated. In this embodiment the transmission rate of the optical signal can be changed between 156 Mbps, 622 Mbps, and 2488 Mbps without suspending the optical receiver circuit 10.

The optical receiver circuit 10 includes a receiver optical assembly 11, a Clock and Data Recovery (CDR) section 200, a memory section 220, a switch section 240, and a decision section 260. The optical receiver circuit 10 further includes an unshown next-stage circuit connected to an output terminal 250 of the switch section 240. The next-stage circuit receives an electric signal resulting from an optical signal from the output terminal 250, and performs predetermined signal processing. The CDR section 200, memory section 220, switch section 240, decision section 260, and next-stage circuit are mounted on a circuit board (not shown). The receiver optical assembly 11 has signal pins 171-173 and is connected through these signal pins to the circuit board.

The receiver optical assembly 11 receives and converts an optical signal into a voltage signal, then filters and amplifies the voltage signal, and then outputs the filtered, amplified signal. The receiver optical assembly 11 has a light-receiving device 12, a pre-amplifier 14, and amplifying sections 191-193. In the present embodiment the receiver optical assembly 11 is housed in a package having the signal pins 171-173.

The light-receiving device 12 generates an electric current signal according to an optical signal, and outputs the electric current signal to the pre-amplifier 14. In the present embodiment the light-receiving device 12 is a photodiode. The cathode of the light-receiving device 12 is connected to a reference potential 13, and the anode thereof is connected to the input terminal of the pre-amplifier 14. The pre-amplifier 14 converts the electric current signal from the light-receiving device 12 into a voltage signal. This voltage signal has a frequency distribution corresponding to the optical signal. The output of the pre-amplifier 14 branches into three amplifying sections 191-193.

The amplifying sections 191-193 include respective low-pass filters 161-163 and respective main amplifiers 181-183. Each of the input terminals of the low-pass filter 161-163 is connected through a node 195 to the output terminal of the pre-amplifier 14. The low-pass filters 161-163 are used to limit the frequency band of the output voltage signal of pre-amplifier 14 to remove high-frequency noise. The low-pass filters 161, 162, and 163 correspond to the three transmission rates available for an optical signal, i.e., 2488 Mbps, 622 Mbps, and 156 Mbps, respectively. An optical signal can have any one of these transmission rates. The output signal from the pre-amplifier 14 has a frequency distribution according to the present transmission rate. Thus the low-pass filters 161-163 have different cutoff frequencies and different pass bands corresponding to the transmission rates available for an optical signal, so as to be able to adapt for all the transmission rates. Specifically, a filter for a higher transmission rate has a higher cutoff frequency and a wider pass band.

As described above, the low-pass filters 161-163 transmit the components of the output signal of the pre-amplifier 14 which are in the frequency bands corresponding to the transmission rates. Therefore, the low-pass filters 161-163 are each able to remove a noise component without removing a signal component from the voltage signal resulting from the optical signal having a transmission rate corresponding to the filter. The outputs of the low-pass filters 161, 162, and 163 are fed to the respective main amplifiers 181, 182, and 183. The cutoff frequencies of the low-pass filters 161, 162, and 163 and the frequency bands of the main amplifiers 181-183 correspond to the transmission rates available for the optical signal, e.g., 156 Mbps, 622 Mbps, and 2488 Mbps, respectively.

The three voltage signals amplified by the main amplifiers 181-183 are outputted individually through the signal pins 171-173 of the receiver optical assembly 11 to the clock and data recovery section 200. The clock and data recovery section 200 has three clock and data recovery circuits (hereinafter referred to each as "CDR") 201-203. The CDRs 201-203 receive the outputs of the respective main amplifiers 181-183 and extract clock signals from the received signals. The CDRs 201-203 extract the clock signals corresponding to the respective transmission rates, 156 Mbps, 622 Mbps, and 2488 Mbps. Furthermore, the CDRs 201-203 recover data from the output signals of the respective main amplifiers 181-183, using the extracted clock signals.

As described above, the clock signals that can be extracted by the CDRs 201-203 are restricted to the specific transmission rates. PLLs (Phase Locked Loops) in the respective CDRs fail to tune at transmission rates except the selected transmission rate, which results in making the extracted clocks and the recovered data unstable. The clock signals and data recovered by CDRs 201-203 are outputted to the memory section 220. The memory section 220 has three memories 221-223 for storing the recovered clock signals and data. Each memory is one of the FIFO (First In First Out) type such as a shift register or a dual access memory. The outputs of the memories 221-223 are fed to the switch section 240. The switch section 240 has three switches 241-243 for receiving the outputs of the memories 221-223, and outputs the clock signal and the data stored in one of the memories 221-223 selected by these switches 241-243.

The outputs of the memories 221-223 are also fed to the decision section 260. The decision section 260 reads the data from the memories 221-223 and decides the transmission rate of the optical signal based on the read data. The decision section 260 generates a selection signal in accordance with the result of this decision and outputs the selection signal to the switch section 240. This selection signal controls the memory-selection state of the switches 241-243.

Figure 2:
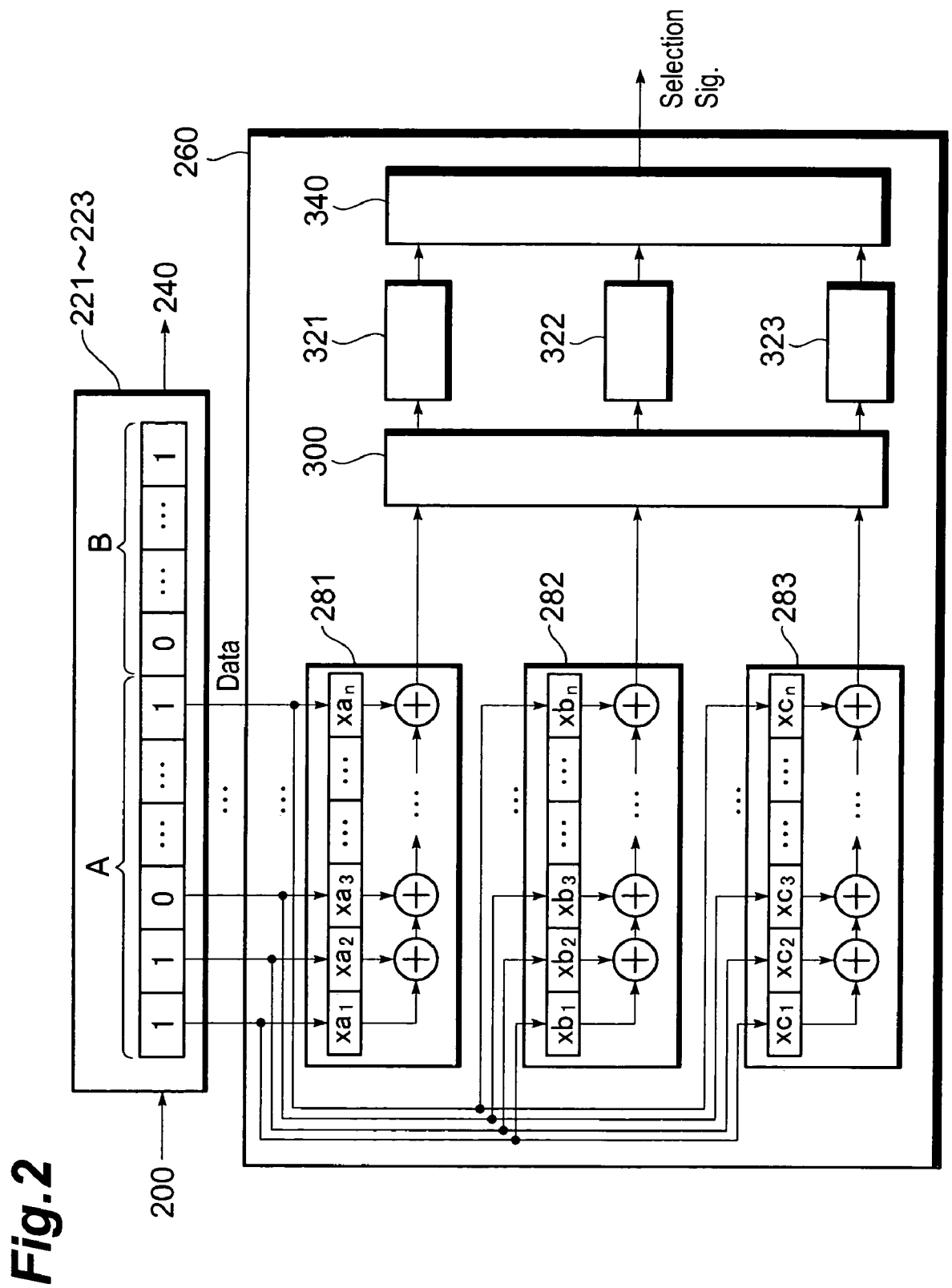
FIG. 2 is a block diagram showing the configuration of a decision section.

The decision section 260 will be described below in more detail. FIG. 2 is a block diagram showing the configuration of the decision section 260. The decision section 260 includes filters 281-283, a normalizer 300, comparators 321-323, and a selector 340.

The filters 281-283 sequentially read a predetermined number of bits from the beginning of the data stored in the memories 221-223 and analyze the frequency components of the data. Specifically, the filters first read the predetermined number of bits, i.e., part A shown in FIG. 2, from the beginning of the data stored in the memory 221. A signal of N bits in this part A is fed to the three filters 281, 282, and 283 in parallel. Then the frequency is determined. The filters 281-283 have different filtering frequencies, which are selected from the frequencies corresponding to the transmission rates for the optical signal. For example, the filter 281 obtains coefficients ($a_1, \ldots, a_n$) for the frequency (=1244 MHz) component corresponding to the transmission rate of 2488 Mbps. Similarly, the filter 282 obtains coefficients ($b_1, \ldots, b_n$) for the frequency (=311 MHz) component corresponding to the transmission rate of 622 Mbps. This is not contained in the signal having the transmission rate of 156 Mbps. The filter 283 obtains coefficients ($c_1, \ldots, c_n$) for the frequency (=77 MHz) component corresponding to the transmission rate of 156 Mbps.

A square sum $(a1^2+\ldots+an^2)$ of the coefficients is equivalent to the intensity of the 1244 MHz component, and $(b1^2+\ldots+bn^2)$ and $(c1^2+\ldots+cn^2)$ are equivalent to the intensities of the 311 MHz component and 77 MHz component, respectively. Hereinafter the output $(a1^2+\ldots+an^2)$ of the filter 281 is called a first signal, the output $(b1^2+\ldots+bn^2)$ of the filter 282 a second signal, and the output $(c1^2+\ldots+cn^2)$ of the filter 283 a third signal. Then the filters 281-283 read an n-bit data, part A, from the next memory 222 and Fourier transform the data to generate the first to third signals. Finally, they also read an n-bit data, part A, from the memory 223 and Fourier transform it to generate the first to third signals.

When receiving the first to third outputs from the filters 281-283, the normalizer 300 normalizes each signal so that the intensity of a predetermined frequency component becomes 1. The normalized first, second, and third signals are fed to the respective comparators 321, 322, and 323. The comparators 321-323 compare the first to third signals, respectively, with a predetermined reference; when these signals are higher than the reference, they output a high level; when the signals are lower than the reference voltage, they output a low level.

The outputs of the comparators 321-323 are fed to the selector 340. The selector 340 outputs a selection signal of a high level when any one of the output signals of the comparators 321-323 is the high level. On the other hand, when all the signals from the comparators 321-323 are the low level, the selector 340 outputs the selection signal of a low level. This selection signal is supplied to one of the switches 241-243 to control the on/off state of the switch. When each switch receives the selection signal of the high level, it turns into an on state. When it receives the selection signal of the low level, it turns into an off state. The destination of the selection signal is determined according to from which memory the data used in generation of the selection signal was read out. Namely, when the selection signal is generated from the data in the memory 221, the selection signal is supplied to the switch 241. Similarly, when the selection signal is generated from the data in the memory 222 or 223, the selection signal is supplied to the switch 242 or 243.

The memories 221-223 continuously store data even during the decision of the transmission rate and during the control of the switches. Each memory has a storage capacity enough to store data (part B shown in FIG. 2) fed during the decision of the transmission rate and during the control of the switch, in addition to the data (part A shown in FIG. 2) having the bit length necessary for the decision of the transmission rate. The storage capacities of the memories 221-223 do not have to be uniform, but the memories 221-223 may be given different storage capacities according to the transmission rates, or according to the transmission standard to define the transmission rates.

The operation of the optical receiver circuit 10 will be described below in detail for each of cases where the transmission rate of the optical signal is one of 156 Mbps, 622 Mbps, and 2488 Mbps.

When the transmission rate of the optical signal is 2488 Mbps, the PLL in CDR 201 comes to tune, and therefore the clock signal of 2488 MHz and data of 2488 Mbps recovered using the clock signal are stored into the memory 221. On the other hand, the PLLs in the CDRs 202 and 203 fail to tune, and thus clock signals and data having unstable frequencies fluctuating with time are stored into the memories 222 and 223.

The decision section 260 first reads the data of 2488 Mbps from the memory 221. Since this data contains the 1244 MHz frequency component as a major component, the first signal outputted from the filter 281 becomes not less than the aforementioned reference voltage. Therefore, the comparator 321 outputs the signal of the high level, and accordingly the selector 340 outputs the selection signal of the high level to the switch 241.

Next, the decision section 260 reads the data from the memory 222. As described above, this data has an unstable frequency and thus has a frequency spectrum like floor noise in the frequency band of not more than 1244 MHz. For this reason, the intensity is low at each frequency component of 1244 MHz, 311 MHz, and 77 MHz, and as a result, all the first to third signals outputted from the filters 281-283 become less than the reference voltage. Therefore, all the comparators 321-323 output the signal of the low level and the selector 340 outputs the selection signal of the low level to the switch 242. Subsequently, the decision section 260 reads the data from the memory 223. Since this data also has an unstable frequency, the first to third signals outputted from the filters 281-283 become less than the reference voltage. Therefore, all the comparators 321-323 output the signal of the low level and the selector 340 outputs the selection signal of the low level to the switch 243.

As described above, when the transmission rate of the optical signal is 2488 Mbps, only the switch 241 connected to the memory 221 is turned on, and the other switches 242 and 243 are kept off. This results in reading the clock signal of 2488 MHz and the data of 2488 Mbps from the memory 221 and outputting them.

When the transmission rate of the optical signal is 622 Mbps, the PLL in the CDR 202 comes to tune, and the clock signal of 622 MHz and the data of 622 Mbps are stored into the memory 222. On the other hand, the PLLs in the CDRs 201 and 203 fail to tune, and thus the clock signals and data stored in the memories 221 and 223 come to have unstable frequencies fluctuating with time. The decision section 260 sequentially reads the data from the memories 221-223 storing this state of data, and determines the frequency components of 77 MHz, 311 MHz, and 1244 MHz by Fourier transform in the same manner as above; only the output of the filter 282 indicates a significant value upon selection of the memory 222, and the selection signal of the high level at that time is outputted to the switch 241.

When the transmission rate of the optical signal is 156 Mbps, the PLL in the CDR 203 comes to tune and the clock signal of 156 MHz and the data of 156 Mbps are stored into the memory 223. On the other hand, the PLLs in the CDRs 201 and 202 fail to tune, and thus the clock signals and data stored in the memories 221 and 222 come to have unstable frequencies fluctuating with time. The decision section 260 sequentially reads the data from the memories 221-223 storing this state of data and determines the frequency components of 77 MHz, 311 MHz, and 1244 MHz by Fourier transform in the same manner as above; only the output of the filter 283 indicates a significant value upon selection of the memory 223 and at that time the selection signal of the high level is outputted to the switch 241 to select the memory 223.

Since the optical receiver circuit 10 has the individual main amplifiers 181-183 for the respective transmission rates, it can amplify the electric signal resulting from the optical signal according to the transmission rate of the optical signal, at the different frequency bands and gains. Accordingly, even if different receiving sensitivities are required according to the transmission rates, the receiving sensitivities can be optimized for the respective transmission rates by properly setting the gains of the respective main amplifiers.

Second Embodiment

The second embodiment of the present invention will now be described. This embodiment involves two transmission rates of 622 Mbps and 2488 Mbps available for optical signals. Therefore, the optical receiver circuit of the present embodiment has the configuration obtained by eliminating the amplifier 193, CDR 203, memory 223, switch 243, filter 283, and comparator 323, which correspond to the transmission rate of 156 Mbps, from the optical receiver circuit 10 of the first embodiment.

Figure 3:
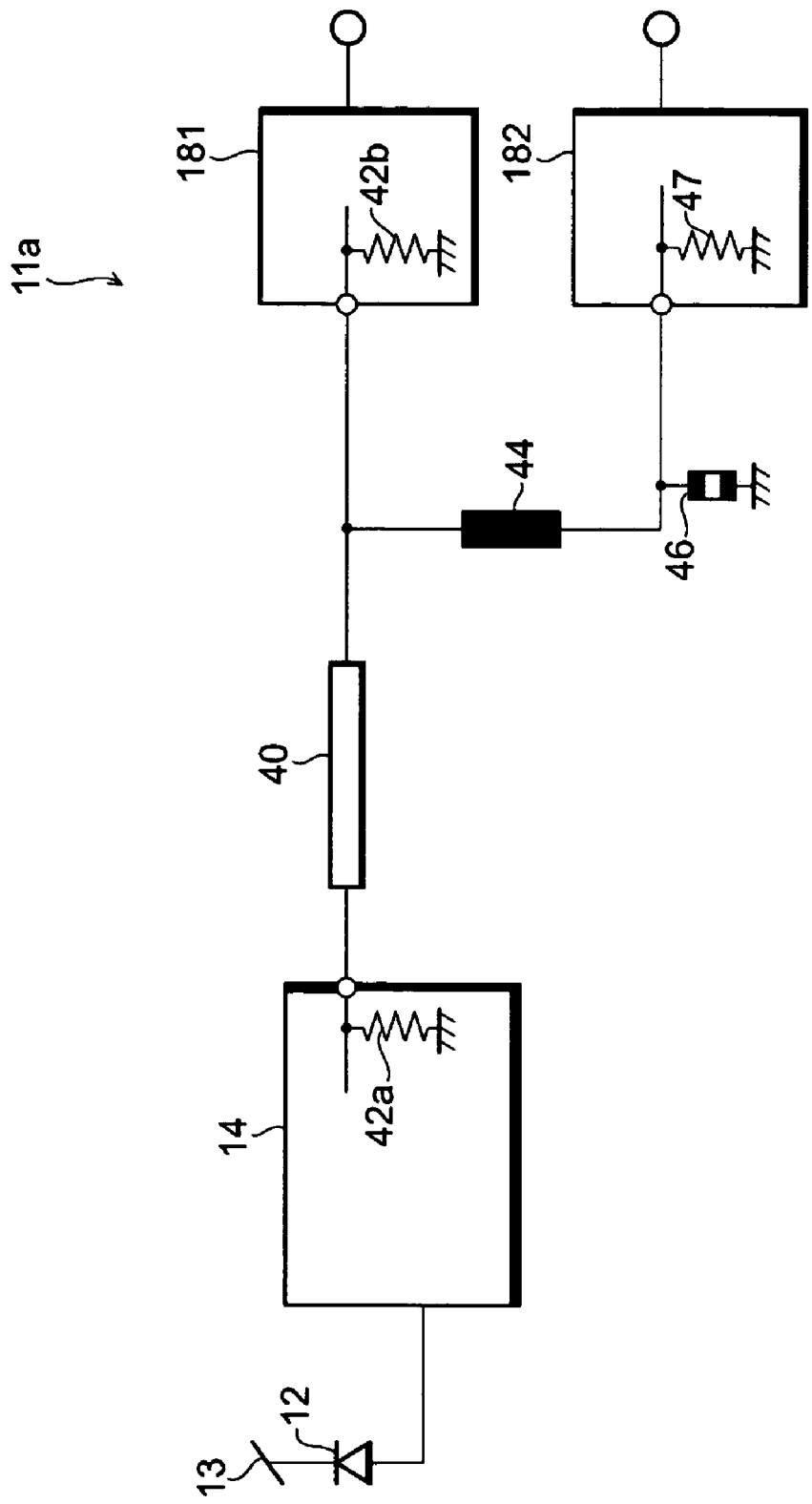
FIG. 3 is a block diagram showing the configuration of a receiver optical assembly in the second embodiment.

FIG. 3 is a block diagram showing the configuration of a receiver optical assembly 11*a* in the present embodiment. The receiver optical assembly 11*a* is different from the receiver optical assembly 11 in the first embodiment in that there is a transmission line 40 provided between the pre-amplifier 14 and the main amplifiers 181 and 182. An example of the transmission line 40 is a strip line, a micro strip line, a coplanar line, or the like.

Terminating resistors 42*a* and 42*b* are connected to the opposite ends of the transmission line 40. In the present embodiment the terminating resistor 42*a* provides an output impedance of pre-amplifier 14, and resistors 42*b* and 47 provide input impedances of the respective main amplifiers 181 and 182. The characteristic impedance of the transmission line 40 is matched with the resistance of the terminating resistors 42*a* and 42*b*, and the resistance is 50Ω. A resistor 44 is connected between the transmission line 40 and the input of the main amplifier 181, and a capacitor 46 is disposed between the resistor 44 and the input of the main amplifier 182 to be connected in parallel with the input of the main amplifier 182. The resistor 44 and the capacitor 46 constitute a low-pass filter. Where the transmission line 40 is a 50Ω line and the signal transmission rate is approximately from 100 Mbps to 1 Gbps, the preferable resistance of the resistor 44 is approximately from 10Ω to several kΩ. In the present embodiment, the resistance of the resistor 44 is 62Ω, the resistance of the resistor 47 10 kΩ, and the capacitance of the capacitor 46 1.0 pF.

In this configuration, the signal generated from the optical signal branches into the main amplifiers 181 and 182. In the present embodiment, in order to realize the branching of the signal by means of only the active components, the main amplifier for the high-speed signal (2488 Mbps) is connected directly to the transmission line 40 without intervention of resistor, and the main amplifier for the low-speed signal (622 Mbps) is connected through the resistor 44 to the transmission line 40.

On the occasion of carrying out the branching of the high-frequency signal, problems of reflection and loss will arise. However, since the present embodiment is arranged to transmit the signal by use of the transmission line 40 terminated by the terminating resistors 42*a* and 42*b*, the reflection can be suppressed. The main amplifier 182 for the low-speed signal is connected through the relatively large resistor 44 to reduce impedance mismatching of the signal transmission line due to the branching of the signal line, whereby the reflection and loss can be suppressed. Since the low-speed signal is less affected by reflection than the high-speed signal, it is feasible to suppress waveform distortion even with the resistor 44 installed.

Furthermore, since the individual main amplifiers 181 and 182 are prepared for the respective transmission rates as in the case of the first embodiment, the voltage signal resulting from the optical signal can be amplified at different bands and gains according to the transmission rates of the optical signal and the receiving sensitivities can be optimized for the respective transmission rates. For example, the optical receiver of the present embodiment has the receiving sensitivity of −20 dBm for the signal of 2488 Mbps and the receiving sensitivity of −30 dBm for the signal of 622 Mbps.

Third Embodiment

Figure 4:
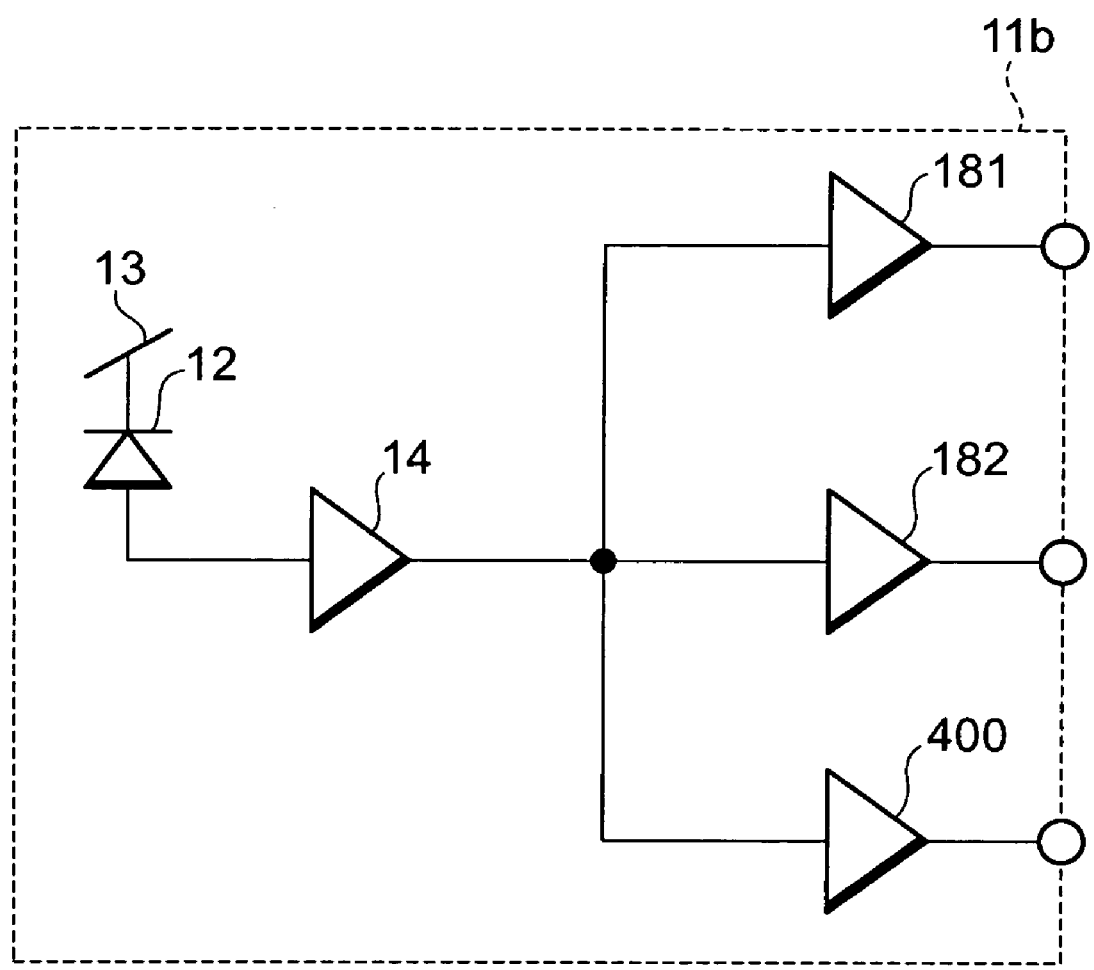
FIG. 4 is a block diagram showing the configuration of a receiver optical assembly in the third embodiment.

The third embodiment of the present invention will now be described. In this embodiment the transmission rate of the optical signal is either 622 Mbps or 2488 Mbps. FIG. 4 is a block diagram showing the configuration of receiver optical assembly 11*b* in the present embodiment. The receiver optical assembly 11*b* has an AGC (Automatic Gain Control) amplifier 400 for analog video signals, instead of the main amplifier 183 for 156 Mbps data. A band-limiting filter may be provided, if necessary, between the amplifier and pre-amplifier 14. This configuration permits the optical receiver to properly receive an analog signal even in a case where the optical signal can be the analog signal as well as the digital signal.

The present invention has been described above in detail on the basis of the embodiments thereof. It is, however, noted that the present invention is by no means limited to the above embodiments. The present invention can be modified in various ways without departing from the spirit and scope thereof. For example, the transmission rate of the optical signal do not have to be limited to 156 Mbps, 622 Mbps, or 2488 Mbps, but may be any other transmission rates. When the optical signal has N (N is an integer of 2 or more) transmission rates, the optical receiver preferably has N low-pass filters, N main amplifiers, N CDRs, N memories, N switches, N filters, and N comparators corresponding to the respective transmission rates.

The above embodiments show the memories 221-223 as separate storage devices, but, instead thereof, a plurality of storage areas in a single storage device may be used as the memories. The CDRs 201-203 may be replaced by a single CDR configured to sequentially extract the clock signals in a plurality of frequency ranges and to recover the data by use of those clock signals. The above embodiments involve the decision of the transmission rate by filtering the data recovered by the CDRs, but the transmission rate may be decided by any other method. For example, where the optical signal contains predetermined identification data (a character string or the like) indicating a transmission rate or a transmission standard, the transmission rate can be decided by specifying one containing the identification data out of the data recovered by the respective CDRs. This method uses the fact that only the CDR corresponding to the transmission rate can correctly recover the identification data.

Whether the recovered data contains the identification data may be determined by means of a correlator. In this case, the decision section 260 has a single correlator, instead of the filters 281-283 and normalizer 300. The recovered data and the foregoing identification data are fed into the correlator. A degree of correlation outputted from the correlator is compared with a predetermined reference value by a single comparator provided instead of the comparators 321-323. When the degree of correlation is not less than the reference value, the optical signal is determined to contain the identification data and the switch corresponding to the memory from which the data was read is turned on. On the other hand, when the degree of correlation is less than the reference value, the optical signal is determined not to contain the identification data, and the switch corresponding to the memory from which the data was read is kept off. This results in reading the data having the decided transmission rate and the clock signal having the same frequency as the transmission rate, from the memory and outputting them from the output terminal 150.

What is claimed is:

1. An optical receiver circuit for receiving an optical signal having one of a plurality of transmission rates, comprising:
    a light-receiving section for converting the optical signal into an electric signal;
    a recovery section for extracting a plurality of clock signals from the electric signal in different frequency ranges corresponding to the transmission rates, and for recovering a plurality of data from the electric signal using the clock signals;
    a plurality of memories for individually storing the plurality of data;
    a decision section for reading the plurality of data from the memories, for deciding the transmission rate, and for outputting a selection signal; and
    a selecting section for selecting one of the memories according to the selection signal, and for reading the data out of the selected memory.

2. The optical receiver circuit according to claim 1, wherein the decision section decides the transmission rate by filtering frequency components of the plurality of data, the frequency components corresponding to the plurality of transmission rates.

3. The optical receiver circuit according to claim 1,
    further comprising a plurality of amplifying units disposed between the light-receiving section and the recovery section, the amplifying units each having a low-pass filter and a main amplifier connected in series to the low-pass filter,
    wherein the low-pass filter in one of the amplifying units has a cutoff frequency corresponding to one of the transmission rates, and
    wherein the main amplifier in one of the amplifying units has a frequency band and a gain corresponding to one of the transmission rates.

4. A method for receiving an optical signal having a plurality of transmission rates and recovering a clock signal and a data signal contained in the optical signal by an optical receiver that includes a receiving optical assembly, a clock and data recovery section, a memory section, a switch section, and a decision section, said method comprising:
    (a) converting the optical signal into an electric signal by the receiving optical assembly;
    (b) extracting a plurality of clock signals and data signals from the electric signal by the clock and data recovery section, both the clock signals and the data signals corresponding to the transmission rates;
    (c) storing the data signals in respective memories;
    (d) filtering the data signals and deciding transmission rates of the data signals by the decision section; and
    (e) selecting a data signal corresponding to the decided transmission rate from the data signals by the switch section and selectively reading the selected data signal from the memories.

5. The method according to claim 4, further comprising, after the step (a) and before the step (b), a step for branching the electrical signal into a plurality of amplifying sections each providing a low-pass filter and a main amplifier connected in series to the low-pass filter,
    wherein the low-pass filter provided in one of the amplifying sections has a cutoff frequency corresponding to one of the transmission rates, and
    wherein the main amplifier provided in one of the amplifying sections has a frequency band and a gain corresponding to one of the transmission rates.

6. The method according to claim 4, wherein the step (c) includes:
    a step for continuously feeding the data signals to a plurality of digital filters, each digital filter having a cutoff frequency corresponding to one of the transmission rates, and
    a step for comparing outputs from respective digital filters to decide the transmission rate.

7. A method for receiving an optical signal having a plurality of transmission rates and recovering a clock signal and a data signal contained in the optical signal by an optical receiver that includes a receiving optical assembly, a clock and data recovery section, a memory section, a switch section, and a decision section, said method comprising:
    (a) converting the optical signal into an electric signal by the receiving optical assembly;
    (b) branching the electrical signal into a plurality of amplifying sections each providing a low-pass filter and a main amplifier connected in series to the low-pass filter;
    (c) extracting a plurality of clock signals and data signals from the electric signal by the clock and data recovery section, both the clock signals and the data signals corresponding to the transmission rates;
    (d) filtering the data signals and deciding transmission rates of the data signals by the decision section; and
    (e) selecting a data signal corresponding to the decided transmission rate from the data signals by the switch section, wherein
    the low-pass filter provided in one of the amplifying sections has a cutoff frequency corresponding to one of the transmission rates, and
    the main amplifier provided in one of the amplifying sections has a frequency band and a gain corresponding to one of the transmission rates.

8. A method for receiving an optical signal having a plurality of transmission rates and recovering a clock signal and a data signal contained in the optical signal by an optical receiver that includes a receiving optical assembly, a clock and data recovery section, a memory section, a switch section, and a decision section, said method comprising:
    (a) converting the optical signal into an electric signal by the receiving optical assembly;
    (b) extracting a plurality of clock signals and data signals from the electric signal by the clock and data recovery section, both the clock signals and the data signals corresponding to the transmission rates;
    (c) filtering the data signals and deciding transmission rates of the data signals by the decision section;
    (d) continuously feeding the data signals to a plurality of digital filters, each digital filter having a cutoff frequency corresponding to one of the transmission rates;
    (e) comparing outputs provided from respective digital filters to decide the transmission rate; and
    (f) selecting a data signal corresponding to the decided transmission rate from the data signals by the switch section.

* * * * *